(12) United States Patent
Story

(10) Patent No.: US 6,219,685 B1
(45) Date of Patent: Apr. 17, 2001

(54) METHOD TO DETECT IEEE OVERFLOW AND UNDERFLOW CONDITIONS

(75) Inventor: Shane Story, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/148,173

(22) Filed: Sep. 4, 1998

(51) Int. Cl.[7] .................................................. G06F 7/00
(52) U.S. Cl. ............................................ 708/498; 708/552
(58) Field of Search ..................................... 708/498, 552

(56) References Cited

U.S. PATENT DOCUMENTS

| | | | |
|---|---|---|---|
| 5,550,767 | * 8/1996 | Taborn et al. | 708/498 |
| 5,553,015 | * 9/1996 | Elliott et al. | 708/498 |
| 5,936,870 | * 8/1999 | Im | 708/552 |
| 6,061,781 | * 5/2000 | Jain et al. | 708/552 |

* cited by examiner

*Primary Examiner*—David H. Malzahn
(74) *Attorney, Agent, or Firm*—Leo V. Novakoski

(57) ABSTRACT

A method is disclosed for detecting overflow and underflow conditions using a status register having a main status field and first and second alternate status fields. The first and second alternate status fields are set to chop and wre modes, respectively, and chop and wre results are determined for an arithmetic operation using the first and second alternate status fields. The chop and wre results are tested against test values to determine whether an overflow or underflow condition exists.

23 Claims, 3 Drawing Sheets

METHOD TO DETECT IEEE OVERFLOW AND UNDERFLOW CONDITIONS

BACKGROUND OF THE INVENTION

1 Technical Field

This invention relates to processors, and in particular to methods for detecting overflow and underflow during selected processor operations.

2 Background Art

A processor spends a significant portion of its time performing arithmetic operations. To ensure the accuracy of the computed results, the processor checks each operation to determine whether it raised an exceptional condition. The exceptional conditions for floating-point operations are defined by the IEEE 754-1985 Standard for Binary Arithmetic Operations (IEEE Std. 754). For example, arithmetic operations are subject to overflow and underflow exceptions. An overflow exception arises when a calculated number is larger than the largest number that can be represented in the format specified for the number. An underflow exception arises when a calculated number is smaller than the smallest number that can be represented in the format specified for the number. Under certain conditions, this exception is raised only when the result is also inexact, i.e. it can not be expressed exactly. When these exception conditions are detected, the processor passes control to an exception handler, which determines how to handle the condition or accepts some default result for the exception.

For example, under the IEEE Standard for Binary Floating-Point Arithmetic (IEEE Std. 745-1985)(IEEE Std.), a single precision floating-point number for 32 bit arithmetic is specified by a sign bit, 8 exponent bits, and 23 significant bits. If an arithmetic operation generates a number that is too large to be represented using the 8 available (positive) exponent bits, an overflow exception is raised. Similarly, if the number is too small to be represented by the 8 available (negative) exponent bits, an underflow exception is raised.

Exception checking must be both accurate and fast. If an exception checking method is inaccurate, the processor can generate incorrect results and is subject to crashes. Exception checking is done concurrently with the arithmetic operation being checked to minimize its impact on the processor speed. If the exception checking process is slower than the operation it is monitoring, performance of the processor is degraded.

One method for exception checking compares the results of an operation with a threshold value. The threshold value is usually the largest (smallest) number that can be represented in the format specified for the result. The result is compared with the numerical threshold, and an overflow (underflow) exception is raised if the result is greater (less) than the numerical threshold. One problem with this approach is that breaks down for certain situations when, as is common, results are rounded off. For example, if the calculated result exceeds the threshold value, it is typically rounded down to the threshold value. This approach does not distinguish between results that are rounded down to the threshold value (and rightfully raise an overflow exception) and results that just happen to equal the threshold value (and should not raise an exception).

Another method for detecting exceptions reads and writes explicit hardware flags in a status register to identify overflow or underflow conditions. The status register specifies various parameters to the processor for performing an arithmetic operation and is updated by the processor on the status of the operation. Before the operation begins, the current contents of the status register are read and saved, and control fields of the register are updated to indicate a mode for the operation. When the operation completes, status flags in the register are read to identify any overflow/underflow conditions raised by the operation. The original register contents are then updated with any new conditions (overflow/underflow) raised by the operation, and the updated contents are written back to the status register.

One drawback of this approach is that each read and write of the status register is a serializing operation. The instructions must be performed sequentially, and any instructions following a register read/write can not proceed until the read/write operation is completed. This makes detecting exceptions a relatively slow process. In a high performance processor, where every additional clock cycle is important, the method is inadequate.

The present invention address these and other issues associated with detecting exception conditions in various operations.

SUMMARY OF THE INVENTION

The present invention is a method for detecting overflow and underflow conditions efficiently.

A method in accordance with the present invention specifies first and second modes for an arithmetic operation. First and second mode results are determined for the operation, using the specified first and second modes. The first and second mode results are then compared with test values to identify underflow and overflow conditions.

For one embodiment of the invention, the first mode is a truncate or chop mode and the second mode is a widest-register-exponent (wre) mode. An overflow exception is raised if the magnitude of a wre result exceeds an overflow threshold, and an underflow exception is raised if the wre result is not zero, the chop result is a denormal, unnormal, zero result, and the underflow exception trap is enabled.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DISCUSSION OF THE INVENTION

Figure 1:
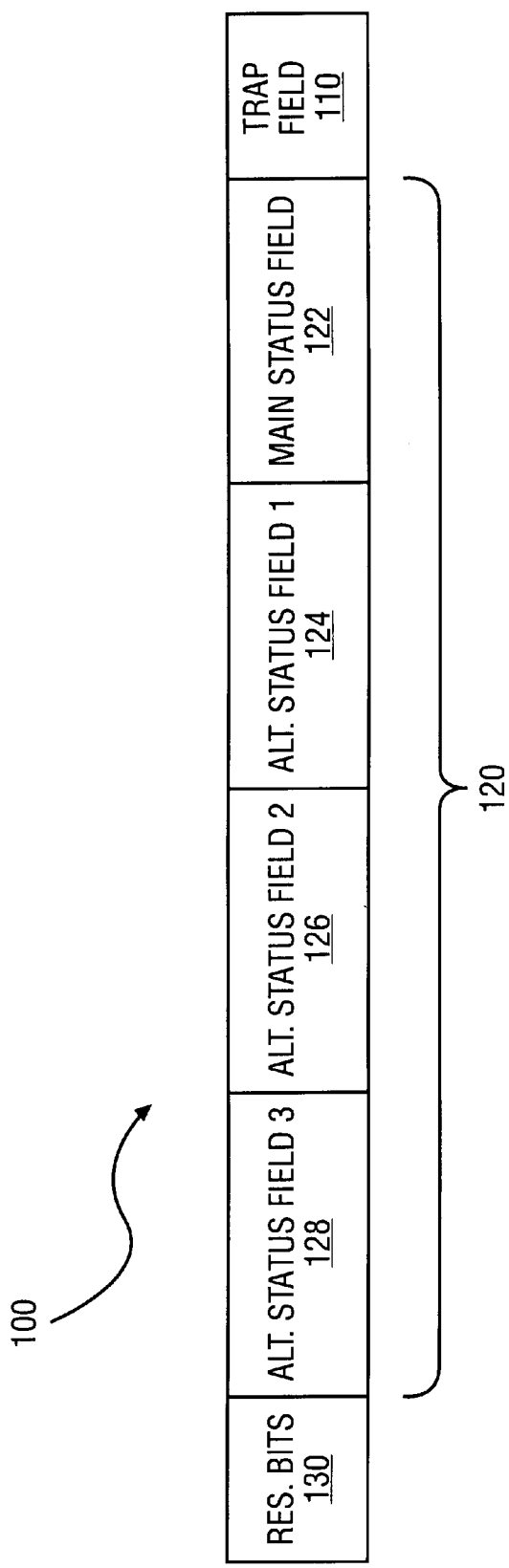
FIG. 1 is a block diagram of one embodiment of a floating-point status register that is suitable for use in the present invention.

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

The present invention is illustrated with respect to IEEE Std. 745-1985, but the invention is not limited to this standard. According to this standard, an arithmetic operation raises an overflow exception whenever the rounded true result of the arithmetic operation would exceed the largest finite number that can be represented in the destination format, i.e. the data format specified for the result. If an overflow exception is detected and the corresponding exception trap (the IEEE Floating-point Exception Trap) is disabled, the operation returns either infinity or the correctly signed maximum normal value for the destination format.

Underflow is defined with respect to "tininess" and "inexactness". It is raised under different circumstances depending on whether the underflow exception is masked (disabled) or unmasked (enabled). According to the IEEE Std, a result is "tiny" if the result, when computed with an unbounded exponent range, would yield a non-zero value that lies between $-2^{Exp(min)}$ and $+2^{Exp(min)}$. Here, Exp(min) is the smallest exponent in a given representation. A result is "inexact" when the result differs from the result that would have been computed if both the exponent range and precision were unbounded. When the underflow exception trap is disabled, an underflow exception is raised if the result of an arithmetic operation is both tiny and inexact. When the underflow exception trap is enabled, an underflow exception is raised when the result of the operation is tiny, regardless of whether it is inexact.

The present invention is a method for detecting overflow and underflow conditions quickly and accurately. The method is implemented using a series of native instructions and a single read of a status register in a time critical path of the arithmetic operation that is being checked. It eliminates errors associated with the threshold method for detecting overflow and underflow exceptions, and it is faster than conventional methods that require multiple reads/write operations to the status register.

For one embodiment of the present invention, a status register including a main status field and two or more alternate status fields is employed. Each of the status fields includes control bits that allow a calculation mode to be specified for a corresponding arithmetic operation. For example, a floating-point operation may be implemented in a rounding (chop) mode or a widest range exponent (wre) mode. In chop mode, the result of an arithmetic operation is truncated in a specified manner. In wre mode, the result is calculated using the full range of exponent bits available in the register, independent of the number of bits in the specified data format. For this embodiment, the mode of each available status fields may be set by a single write of the status register.

For one embodiment of the invention, three status fields of the status register are set to an original mode, a chop mode, and a wre mode to provide an original result, a chop result, and a wre result, respectively, of the arithmetic operation. The operations are performed with the same status register by specifying the appropriate status field for each operation. The results are then filtered to determine whether an overflow or an underflow exception is raised.

FIG. 1 is a block diagram of one embodiment of a floating-point status register (FPSR) 100 that is suitable for implementing the present invention. FPSR 100 provides information to the processor for implementing a corresponding floating-point operation. This information indicates, for example, whether to respond when the arithmetic operation generates a particular exception and which of the different modes will be used to determine the result. These modes are discussed below in greater detail.

The disclosed embodiment of FPSR 100 includes a trap field 110, a main status field 122, and first, second, and third alternate status fields 124, 126, and 128, respectively. Trap field 110 includes a series of bits, each of which may be set to disable various exception faults and exception traps. When any of these faults/traps are enabled, i.e. the bit is not set, the processor jumps to an exception handling routine if the corresponding fault/trap exception is raised during the arithmetic operation. The fault/trap is ignored when the bit is set or some operating system default action is performed. Status fields 122, 124, 126, 128 (collectively, "status fields 120") specify up to four different modes for implementing the operation and track any exceptions generated when the operation is implemented in the corresponding mode.

Figure 2:
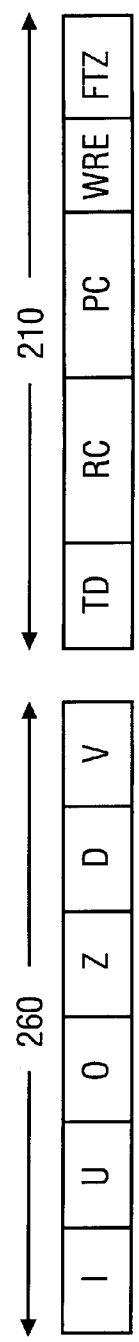
FIG. 2 is a block diagram of one embodiment of a status field in the floating-point status register of FIG. 1.

FIG. 2 is a block diagram of one embodiment of status field 120, including a control field 210 and a flag field 260. Control field 210 includes a number of sub-fields for specifying the mode in which the operation is to be implemented. Flag field 260 includes a number of sub-fields (flag bits), each of which may be set if the operation generates an exception. Control fields 210 and their meanings are summarized in Tables 1, 2, and 3. Flag fields 260 are summarized in Table 4.

TABLE 1

| Control Sub-Field | Bit Range | Description |
|---|---|---|
| ftz | 0 | flush to zero mode |
| wre | 1 | widest range exponent |
| pc | 3:2 | precision control |
| rc | 5:4 | rounding control |
| td | 6 | traps disabled |

Here, ftz mode causes results that encounter "tininess" to be truncated to a correctly signed zero value when bit 0 is set. Similarly, td mode prevents flag sub-fields from being set when the corresponding exceptions are encountered. The other entries are discussed below.

The result of a floating-point operation is rounded according to an indication associated with the instruction that programs the operation, e.g. an instruction completer, and the status of control sub-fields wre, pc and rc. The instruction completer, wre, and pc specify the significand precision and exponent range of the result. If the result is not exact, rc indicates how the result is rounded. The different modes for one embodiment of the invention are summarized in Tables 2 and 3.

TABLE 2

| Instruction Completer | pc | wre | Significand Precision | Exponent Range | Computation Style |
|---|---|---|---|---|---|
| parallel FP | ignore | ignored | 24 bits | 8 bits | 2 PA-RISC SP |
| .s | ignore | 0 | 24 bits | 8 bits | 1 PA-RISC SP |
| .d | ignore | 0 | 53 bits | 11 bits | 1 PA-RISC DP |
| .s | ignore | 1 | 24 bits | 17 bits | full reg. file SP |
| .d | ignore | 1 | 53 bits | 17 bits | full reg. file DP |
| none | 00 | 0 | 24 bits | 15 bits | IA-32 stack SP |
| none | 01 | 0 | NA | NA | Reserved |
| none | 10 | 0 | 53 bits | 15 bits | IA-32 stack double |
| none | 11 | 0 | 64 bits | 15 bits | IA-32 double-extended |
| none | 00 | 1 | 24 bits | 17 bits | full reg. file SP |
| none | 01 | 1 | NA | NA | Reserved |
| none | 10 | 1 | 53 bits | 17 bits | full reg. file DP |
| none | 11 | 1 | 64 bits | 17 bits | full reg. file DE |
| NA | ignore | ignore | 64 bits | 17 bits | full reg. file DE |

In table 2, IA refers to elements of the Intel® Architecture, PA-RISC refers to elements of a Hewlett Packard Architecture, SP stands for single precision, DP stands for double precision, and DE stands for double-extended precision.

TABLE 3

| | Nearest (even) | −Infinity (down) | +Infinity (up) | Zero (truncate) |
|---|---|---|---|---|
| rc | 00 | 01 | 10 | 11 |

Flag sub-fields 260, their bit ranges, and descriptions for the disclosed embodiment of FPSR 100 are summarized in Table 4.

TABLE 4

| Flag Sub-Field | Bit Range | Description |
|---|---|---|
| v | 7 | invalid operation (IEEE) |
| d | 8 | denormal/unnormal operand |
| z | 9 | zero divide (IEEE) |
| o | 10 | overflow (IEEE) |
| u | 11 | underflow (IEEE) |
| i | 12 | inexact (IEEE) |

Here, denormal/unnormal operand flag refers to an IEEE-style sticky flag that is set when an operand in an unnormalized format is consumed by an instruction. For the disclosed embodiment, an operand is unnormalized when the most significant bit of the operand is zero in the specified data format. A sticky flag is a flag that must be explicitly set and cleared.

Two or more of the modes summarized in Tables 2 and 3 may be specified in the status fields 120 of status register 100. When an arithmetic operation controlled by the status register is implemented, results in the two or more modes (mode results) are determined concurrently. The present invention filters these mode results to determine whether an underflow or overflow condition exists. The method eliminates two serializing steps from conventional methods, to provide faster results in a critical path of floating-point operations. The method is illustrated for floating-point add and multiply operations, however, the invention is not limited to these operations.

Figure 3:
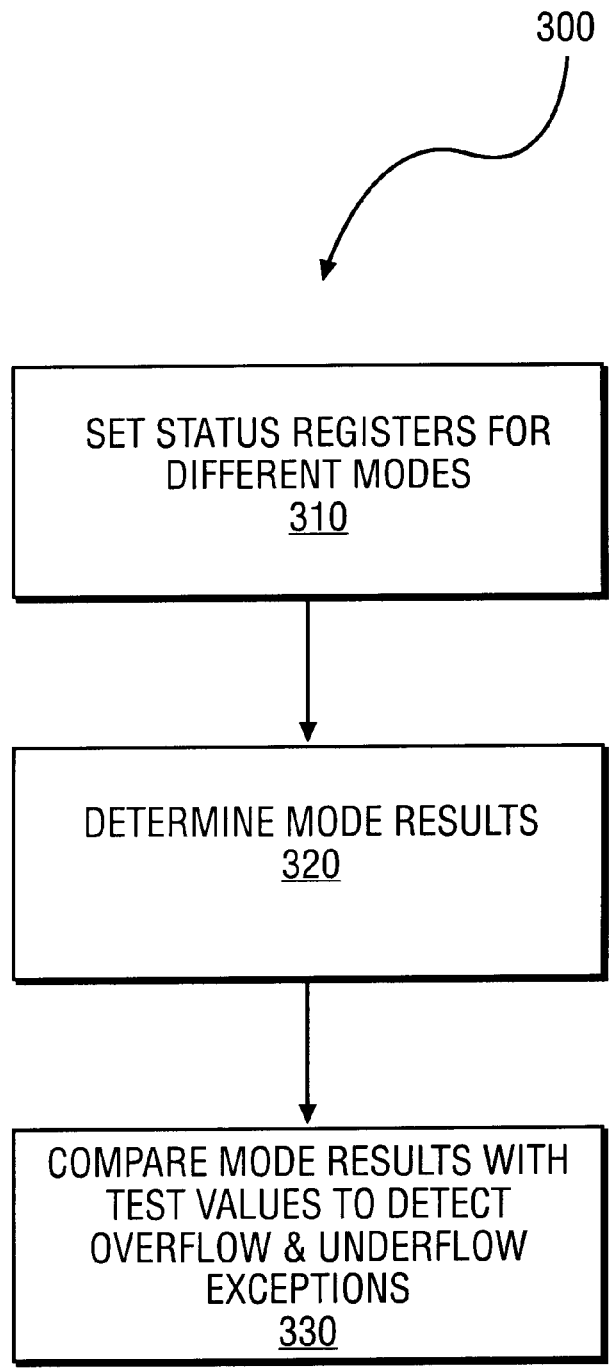
FIG. 3 is a flow chart representing a method in accordance with the present invention for detecting overflow and underflow conditions.

FIG. 3 is an overview of a method 300 for detecting overflow and underflow exceptions in accordance with the present invention. Initially, the status fields of a status register are set 310 to perform the arithmetic operation in different modes. The operation is executed 320 using the different status fields to provide results in the corresponding modes. The mode results are compared with a series of test values to determine whether an overflow or underflow exception was raised.

A key advantage of method 300 is that exceptions are detected by comparing the mode results with test values rather than by performing multiple reads/writes to the status register. The latter are serializing operations, each of which must be completed before any subsequent instructions are executed. On the other hand, method 300 determines the different mode results using native instructions which may be implemented concurrently with other instructions. For filtering purposes, a single read of the status register indicates whether the underflow exception trap is enabled.

Figure 4:
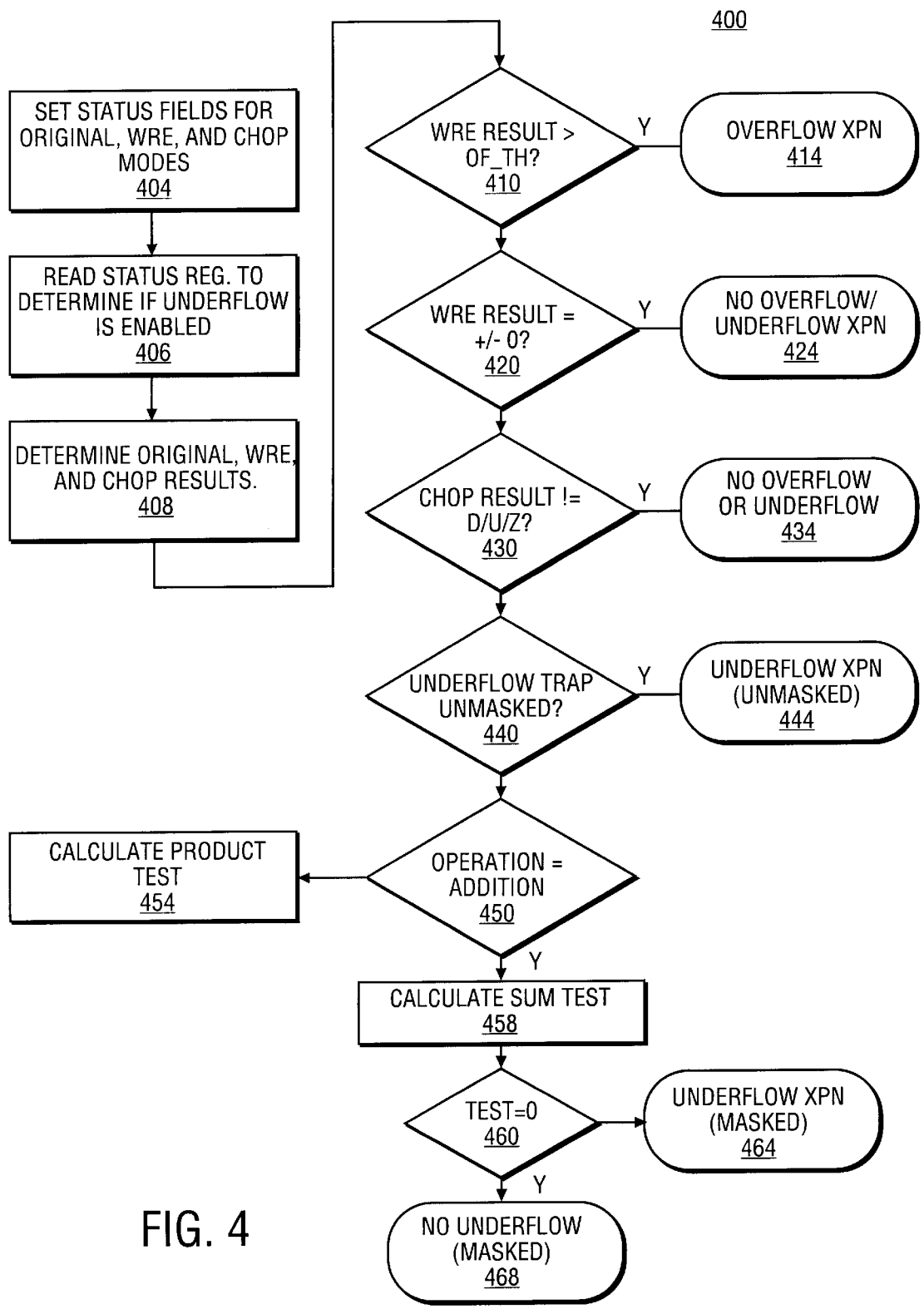
FIG. 4 is a detailed flowchart representing one embodiment of the method of FIG. 3.

FIG. 4 illustrates one embodiment of method 300 in greater detail. In the disclosed embodiment, the status register is set 404 to indicate an original mode, a wre mode, and a chop mode in its first, second and third status fields, respectively. Here, original mode refers to the mode specified for the operation that is being checked. For the wre and chop modes, td is set to disable the exception flags. The status register is also read 406 to determine whether the underflow exception trap is enabled. The status of the underflow exception trap determines the conditions under which an underflow exception is raised. The arithmetic operation is then implemented using the status fields to determine 408 original, wre, and chop results.

Following step 408, the different mode results are tested to identify any exception conditions. The wre result is compared 410 with an overflow threshold value (OF_TH). OF_TH is represented with a number of exponent bits determined by the format of the calculation, e.g. single, double, and double-extended real formats. The wre result is determined using all available exponent bits and allows values larger than the largest representable single, double, and double-extended precision results in the instruction set architecture to be represented. This eliminates the risk of truncating the wre result to OF_TH, and the outcome of comparison 410 is unambiguous. If the magnitude of the wre result exceeds OF_TH, an overflow condition is indicated 414.

If comparison 410 does not indicate an overflow condition, the wre result is compared 420 with zero. If the wre result equals zero, at least one of the operands is zero, and neither overflow nor underflow is possible. In this case, the exception testing is complete an no exception is indicated 424. If steps 414 or 424 are not reached, test results based on the wre result are inconclusive. An overflow condition can be ruled out but an underflow condition may exist.

The remaining steps of method 400 check for underflow exceptions. These tests are more involved since underflow is defined differently by the IEEE standard, depending on whether or not the underflow exception trap is enabled (as determined in step 406). In the disclosed embodiment, it is determined 430 whether the chop result is denormalized, unnormalized, or zero. Step 430 is reached only if the wre result is non-zero (step 420). If comparison 430 indicates the chop result is also non-zero, the result is representable in the specified format, and underflow is ruled out. Exception testing is complete and no exception is indicated 434.

If the chopped result is a denormalized, unnormalized, or zero result, it is due to the rounding mode employed, since step 420 picks out those original results that are actually zero. In this case, the original result is "tiny". Under the IEEE standard, an underflow exception is raised for a "tiny" result if the underflow exception trap is enabled. This is determined 440 by reference to the value read in step 406. An underflow exception is raised 444 if the underflow exception trap is enabled and the result is tiny.

If the underflow exception trap is not enabled, additional tests are necessary to determine whether to raise an underflow exception. In the disclosed embodiment, these tests determine whether the original result is "inexact". Under the IEEE standard, an underflow exception is raised when the underflow exception trap is disabled only if the original result is both "tiny" and "inexact".

The disclosed embodiment of method 400 determines "inexactness" in the steps following step 440. It is determined 450 whether the operation is addition or multiplication. If the operation is determined 450 to be multiplication, a product test value is calculated 454. For the disclosed embodiment, the product test value is given by:

P_TEST_VAL=(operand1*operand2−original result)

using wre mode.

If the operation is determined 450 to be addition, a sum test value is calculated 458. The sum test value is given by:

S_TEST_VAL =[(operand1—original result) +operand2]using wre mode.

These operations are readily performed using native instructions (fmac and fadd) and the status fields set in step 404. In each case, the calculated test value is compared 460 with zero. If the test value is zero, the result is exact, and no exception is raised 468. If the test value is not zero, the result is inexact, and an underflow exception is raised 464.

A pseudo-code representation of method 400 for a floating-point add or multiply in a particular instruction set is as follows (S0 is the main status field):

```
*fsetc S1 =S0 or rtz +td (set first alternate status field)
*fsetc S2 =S0 or wre +td (set second alternate status field)
*fetch +/-OF_TH for IEEE single, double, or double-extended format
**mov r77 =ar40 (FPSR)
resultS0=A+/* B using status field s0 (original)
resultS1=A+/* B using status field s1 (chop)
resultS2=A+/* B using status field s2 (wre)
```

```
fcmp:            resultS2 >= +OF_TH       → set (a) if true
fcmp:            resultS2 <= -PF_TH       → set (b) if true
fcmp:            results2 == 0            → set (c) if true
fclass:          results1 ≠ denorm/unorm/0 → set (d) if true
if(a or b)                                → goto OVERFLOW
if(c or d)                                → goto CONTINUE
if(!d and U unmasked)                     → goto UNMASKED UNDERFLOW
if(!d and multiply)     fma: test1 = A*B - resultsS0 using S2
if(!d and add)          fadd: test2 = A - resultS0 using S2
                        fadd: test2 = test2 + B using S2
if(!d and multiply)     fcmp: test1 != 0  → set (e) if true
if(!d and add)          fcmp: test2 != 0  → set (d) if true
if(e)                                     → goto MASKED UNDERFLOW
```

The steps indicated by a single asterix set the different status fields of the status register (fsetc) and fetch the overflow threshold value (fetch). They may be done anytime before the arithmetic operation is implemented. The step indicated by the double asterix (mov r77) reads the status register to determine whether the underflow exception trap is enabled. It is done just before the operation is implemented. ResultSx refers to the result calculated using the mode indicated in status field Sx.

There has thus been provided a method for detecting overflow and underflow exceptions efficiently and accurately. The method employs a floating-point status register having a main status field and multiple alternate status fields. Two alternate status fields are set to chop and wre modes and the operation is performed using the floating-point status register to provide original, chop, and wre results. The wre result is tested to determine whether an overflow condition exists or whether any exceptions can be ruled out. If the wre tests are inconclusive, the chop result is tested to determine whether an underflow condition exists.

The invention has been illustrated with a particular status register structure to more fully illustrate the features of the invention. Persons skilled in the art will recognize that the method may be implemented with a variety of modifications that none the less fall within the spirit of the invention. The invention is limited only by the scope of the appended claims.

What is claimed is:

1. A method of detecting overflow and underflow conditions comprising:
   specifying first and second modes for an arithmetic operation;
   determining first and second mode results for the arithmetic operation, using the specified first and second modes;
   comparing the first and second mode results with test values to identify underflow or overflow conditions.

2. The method of claim 1, wherein specifying first and second modes comprises setting first and second status fields in a status register to specify first and second modes.

3. The method of claim 2, futher comprising setting a third status field to specify a third mode.

4. The method of claim 3, wherein setting the first, second, and third status fields comprises setting the first, second, and third status fields to specify chop, wre, and original modes.

5. The method of claim 4, wherein comparing comprises:
   indicating an overflow exception if a magnitude of the wre result is at least as great as that of an overflow threshold;
   indicating no overflow or underflow exception if the wre result is zero;
   indicating no overflow or underflow exception if the wre result is not conclusive and the chop result is not denormal, unnormal, or zero.

6. The method of claim 2, further comprising reading the status register prior to determining first and second mode results to determine whether an underflow exception trap is enabled.

7. The method of claim 6, wherein setting first and second status fields comprises setting the first status field to chop mode and the second status field to wre mode.

8. The method of claim 7, further comprising setting a third status field to original mode and wherein determining comprises determining chop, wre, and original results using the specified modes.

9. The method of claim 8, wherein comparing comprises:
   indicating an overflow exception if the wre result has a magnitude that is at least as great as that of an overflow threshold value;
   indicating no overflow or underflow exception if the wre result is zero; and
   indicating no overflow or underflow exception if testing the wre result is not conclusive and the chop result is not a denormal, unnormal, or zero result.

10. The method of claim 9, further comprising indicating an underflow exception if testing the wre result is not conclusive, the chop result is denonnal, unnormal, or zero, and the underflow exception trap is enabled.

11. A method for detecting overflow and underflow conditions comprising:
   setting first and second alternate status fields of a status register to chop and wre modes, respectively.
   calculating chop and wre results of an arithmetic operation using the first and second alternate status fields;
   testing the chop and wre results against test values to determine whether an overflow or underflow condition exists.

12. The method of claim 11, wherein testing comprises
   comparing the wre result with an overflow threshold to determine whether an overflow condition exists; and
   comparing the wre result with zero and the chop result with denormal, unnormal, and zero values to determine whether underflow and overflow conditions can be ruled out.

13. The method of claim 11, wherein setting further comprises setting a main status field of the status register to an original mode, the original mode corresponding to a mode specified for the arithmetic operation, and wherein calculating further comprises calculating an original result using the main status field.

14. The method of claim 13, wherein testing comprises:
comparing the wre result with an overflow threshold to determine whether an overflow condition exists; and
comparing the wre and chop results with zero to determine whether no underflow or overflow conditions exist.

15. The method of claim 14, further comprising reading the status register prior to the calculating step to determine whether an underflow exception trap is enabled.

16. The method of claim 15, further comprising indicating an underflow condition if the wre result is not zero, the chop result is a denormal, unnormal, or zero result, and the underflow exception trap is enabled.

17. The method of claim 16, further comprising calculating an operation test value and comparing the operation test value with zero to determine whether an underflow condition exists when the underflow exception trap is not enabled.

18. A method for detecting overflow and underflow conditions comprising:
determining whether an underflow exception trap is enabled;
performing an operation in chop, wre, and selected modes to obtain chop, wre, and selected results;
indicating an overflow condition for the selected result if the wre result exceeds a threshold value;
indicating no overflow or underflow condition if the wre result equals zero; and
indicating an underflow condition if comparison of the wre result is inconclusive, the chop result is a denormal, unnormal, or zero result, and the underflow exception trap is enabled.

19. A machine readable medium that stores instructions which may be executed by a processor to implement a method for detecting overflow and underflow conditions comprising:

specifying first and second modes for an arithmetic operation;
determining first and second mode results for the arithmetic operation, using the specified first and second modes;
comparing the first and second mode results with test values to identify underflow or overflow conditions.

20. The machine readable medium of claim 19, wherein specifying first and second modes comprises setting first and second status fields in a status register to specify first and second modes.

21. The machine readable medium of claim 20, wherein the method further comprises setting a third status field to specify a third mode.

22. The method of claim 21, wherein setting the first second, and third status fields comprises setting the first, second, and third status fields to specify chop, wre, and original modes.

23. The method of claim 22, wherein comparing comprises:
indicating an overflow exception if the magnitude of the wre result is at least as great as that of an overflow threshold;
indicating no overflow or underflow exception if the wre result is zero;
indicating no overflow or underflow exception if the wre result is not conclusive and the chop result is not denormal, unnormal, or zero.

* * * * *